United States Patent
Lin et al.

(10) Patent No.: US 12,399,802 B2
(45) Date of Patent: Aug. 26, 2025

(54) SYSTEM AND METHOD TO MEASURE AND VERIFY DATA AND CONTROL COUPLING BETWEEN SOFTWARE COMPONENTS WITHOUT CODE INSTRUMENTATION

(71) Applicant: Honeywell International Inc., Charlotte, NC (US)

(72) Inventors: Ke Lin, Beijing (CN); Jayakumar S S, Bangalore (IN); Aralakuppe Ramegowda Yogesha, Bangalore (IN); Parag Ravindra Rao, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 109 days.

(21) Appl. No.: 18/180,751

(22) Filed: Mar. 8, 2023

(65) Prior Publication Data
US 2024/0241810 A1 Jul. 18, 2024

(30) Foreign Application Priority Data
Jan. 18, 2023 (IN) .............................. 202311003549

(51) Int. Cl.
G06F 11/362 (2025.01)
G06F 11/3604 (2025.01)

(52) U.S. Cl.
CPC ...... *G06F 11/3636* (2013.01); *G06F 11/3612* (2013.01)

(58) Field of Classification Search
None
See application file for complete search history.

(56) References Cited

U.S. PATENT DOCUMENTS 8,990,777 B2   3/2015   Gounares
10,120,785 B2  11/2018  Meyers
(Continued)

FOREIGN PATENT DOCUMENTS

CN   107703923 A    2/2018
WO   2022256103 A1  12/2022

OTHER PUBLICATIONS

Anonymous, "Data Coupling and Control Coupling Verification VectorCast/Vector", May 24, 2022, as downloaded from http://web.archive.org/web/20220524082255/https://www.vector.corn/us/en/products/products-a-z/software/vectorcast/vectorcast-coupling/, pp. 1 through 5.
(Continued)

*Primary Examiner* — Qing Chen
(74) *Attorney, Agent, or Firm* — Fogg & Powers LLC

(57) ABSTRACT

A method for verifying data and control couplings of software under test comprises obtaining software architecture and design information for the software; extracting expected control coupling information based on an order in which software component calls are in the software architecture; extracting expected data coupling information from one software component to another software component in a sequence diagram; updating the expected control and data coupling information in an expected control and data coupling sequencing table; deriving actual control coupling information from execution trace data obtained from a requirements based test execution; deriving actual data coupling information from data trace information; and updating the actual control and data coupling information in an actual control and data coupling sequencing table. The method then compares the expected and actual control coupling information, and compares the expected and actual
(Continued)

data coupling information, to verify whether software components are interacting with each other as expected.

18 Claims, 11 Drawing Sheets

(56) References Cited

U.S. PATENT DOCUMENTS

| | | | |
|---|---|---|---|
| 10,346,292 B2 | 7/2019 | Seto et al. | |
| 11,221,942 B2 | 1/2022 | Sridhar et al. | |
| 2007/0169113 A1* | 7/2007 | Moore | G06F 8/61 |
| | | | 717/174 |
| 2010/0107180 A1* | 4/2010 | Ulrich | H04L 43/50 |
| | | | 719/318 |
| 2010/0125839 A1* | 5/2010 | Gebis | G06F 8/71 |
| | | | 717/170 |
| 2013/0097583 A1* | 4/2013 | Kung | G06F 8/10 |
| | | | 717/105 |

OTHER PUBLICATIONS

European Patent Office, "Extended European Search Report", dated Jun. 17, 2024, from EP Application No. 24150536.1, from Foreign Counterpart to U.S. Appl. No. 18/180,751, pp. 1 through 12, Published: EP.

Vector, "Complete Verification and Validation for DO-178C Whitepaper—V1.0 Oct. 2019", Oct. 1, 2019, as downloaded Mar. 23, 2022 from https://cdn.vector.com/cms/content/know-how/aerospace/Documents/CompleteVerificationandValidationforD0-178C.pdf, pp. 1 through 20.

Hennell, "Data Coupling and Control Coupling" LDRA Software Technology Technical Note, V1.0, Sep. 2014, pp. 1 through 17.

* cited by examiner

Execution Portion: Example

```
int AirSpeed;
int VerticalSpeed;

void SetAirSpeed (int input){
    AirSpeed = input;
}
int ReadAirSpeed (){
    return AirSpeed;
}
void SetVerticalSpeed (int input){
    VerticalSpeed = input;
}
int ReadVerticalSpeed (){
    return VerticalSpeed;
}
int main ()
{
    SetAirSpeed (100);
    ReadAirSpeed ();
    SetVerticalSpeed (200);
    ReadVerticalSpeed ();
    SetAirSpeed (300);
    ReadAirSpeed ();
    SetVerticalSpeed (400);
    ReadVerticalSpeed ();
}
```

Control Coupling

Requirement:
1) SetAirSpeed(int) should be invoked then ReadAirSpeed() can be invoked
2) SetVerticalSpeed(int) should be invoked then ReadVerticalSpeed can be invoked

Data Coupling

Requirement:
1) Global variable AirSpeed should set by SetAirSpeed() first then ReadAirSpeed() can read the variable
2) Global variable VerticalSpeed should set by SetVerticalSpeed() first then ReadVerticalSpeed() can read the variable

FIG. 8

Execution Portion: Post Analysis

CC Trace Example File

Sequence no: 166—Function main() invoked
Sequence no: 171—Function SetAirSpeed () invoked  ⎫ SetAirSpeed() is invoked at sequence 171
Sequence no: 189—Function ReadAirSpeed () invoked  ⎬ ReadAirSpeed() is invoked at sequence 189
Sequence no: 208—Function SetVerticalSpeed () invoked  ⎫ SetVerticalSpeed() is invoked at sequence 208
Sequence no: 226—Function ReadVerticalSpeed () invoked  ⎬ ReadVerticalSpeed() is invoked at sequence 226
Sequence no: 245—Function SetAirSpeed () invoked
Sequence no: 261—Function ReadAirSpeed () invoked
Sequence no: 278—Function SetVerticalSpeed () invoked
Sequence no: 294—Function ReadVerticalSpeed () invoked

DC Trace Example File

Write — AirSpeed — Sequence no: 181 — Function SetAirSpeed ()  ⎫ AirSpeed is set by SetAirSpeed() at sequence 181
Read — AirSpeed — Sequence no: 199 — Function ReadAirSpeed ()  ⎬ AirSpeed is read by ReadAirSpeed() at sequence 199
Write — VerticalSpeed — Sequence no: 218 — Function SetVerticalSpeed ()  ⎫ VerticalSpeed is set by SetVerticalSpeed() at sequence 218
Read — VerticalSpeed — Sequence no: 236 — Function ReadVerticalSpeed ()  ⎬ VerticalSpeed is read by ReadVerticalSpeed() at sequence 236
Write — AirSpeed — Sequence no: 253 — Function SetAirSpeed ()
Read — AirSpeed — Sequence no: 269 — Function ReadAirSpeed ()
Write — VerticalSpeed — Sequence no: 286 — Function SetVerticalSpeed ()
Read — VerticalSpeed — Sequence no: 302 — Function ReadVerticalSpeed ()

FIG. 9

SYSTEM AND METHOD TO MEASURE AND VERIFY DATA AND CONTROL COUPLING BETWEEN SOFTWARE COMPONENTS WITHOUT CODE INSTRUMENTATION

CROSS-REFERENCE TO RELATED APPLICATION

This application claims priority to Indian Application No. 202311003549, filed on Jan. 18, 2023, the contents of which are incorporated by reference herein in their entirety.

BACKGROUND

Software certification guidelines such as RTCA DO-178C mandates analysis of data and control coupling using requirement-based testing for safety-critical avionics software. The DO-178C guidelines contains define "control coupling" as the manner or degree by which one software component influences the execution of another software component; and define "data coupling" as the dependence of a software component on data not exclusively under the control of that software component.

In addition, a "component" is defined as a self-contained part, combination of parts, subassemblies, or units that perform a distinct function or group of functions of a system. A "component" is used in this context to denote a piece of the software program rather than the entire program. Due to the size and complexity of embedded airborne software programs, developers construct programs that include modules or components (both functional and data components) that interact with one another and depend on one another to perform the program's functions.

The intent of the analysis of data coupling and control coupling is to ensure that each module and component are interacting with each other as expected. That is, the intent is to show that the software modules and components affect one another in the ways in which the software designer intended, and do not affect one another in ways in which they were not intended, thus resulting in unplanned, anomalous, or erroneous behavior. The measurements and assurance should be conducted using requirements-based testing of the integrated components (that is, on the final software program build) in order to ensure that the interactions and dependencies are correct, the coverage is complete, and the objective is satisfied.

Existing testing methods measure the data coupling and control coupling (DC-CC) information of the program by instrumenting the source code. This involves inserting the instrumentation code into a target program for obtaining the DC-CC coverage information and collecting coverage information while executing the requirements-based tests. Instrumentation code generally refers to code for recording in memory, passage through a certain location in source code. Instrumentation codes are embedded in various places in a program. Records resulting from execution at these places are collected to determine the DC-CC exercised in the program, and thus the DC-CC coverage of the program is measured.

The main drawbacks of the instrumentation approach are, firstly, all the requirements-based tests are required to be executed both on instrumented code and non-instrumented code, and checked to confirm the tests execution (pass/fail) status is the same in both cases. This process increases the cost and cycle time of testing activity. Secondly, the insertion of coverage instrumentation increases the code size, which can affect the instrumented application's performance as it will use more memory and increase execution time. Often, size of the instrumented code will be significantly high and cannot be loaded on to the target due to memory limitation. Hence, multiple builds of partially instrumented code files are created and maintained. The number of builds varies between programs based on the available memory size. This again will increase the cost, cycle time, and complexity of the testing activity.

Existing commercial-off-the-shelf (COTS) test tools provide only partial data needed for DC-CC compliance. For example, these tools provide the actual function calls and read/write operations on global variables exercised in the program code during requirements-based test execution. However, a tester must manually derive the DC-CC information from this data, and also needs to compare this information with the expected DC-CC data defined in the software architecture and design to validate the correctness.

SUMMARY

A method and system for measuring and verifying data and control couplings of software under test are provided. The method comprises obtaining software architecture and design information for the software under test; extracting expected control coupling information based on an order in which software component calls are in the software architecture; and extracting expected data coupling information from one software component to another software component in a sequence diagram. The method further comprises updating the expected control coupling information and the expected data coupling information in an expected control coupling and data coupling sequencing table; deriving actual control coupling information from execution trace data obtained from a requirements based test execution; deriving actual data coupling information from data trace information; and updating the actual control coupling information and the actual data coupling information in an actual control coupling and data coupling sequencing table. The method then compares the expected control coupling information with the actual control coupling information, and compares the expected data coupling information with the actual data coupling information, to verify whether software components in the software under test are interacting with each other as expected.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 8 depicts an example of an execution portion to obtain actual data and control coupling information; and FIG. 9 depicts the post analysis of the execution portion of the example of FIG. 8.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for measuring and verifying data coupling and control coupling between software components, without code instrumentation, are described herein. These systems and methods provide a non-intrusive and instrument-less approach, with zero overhead on hardware resources usage (memory and processor throughput), while also substantially reducing the overall cycle time required for data and control coupling analysis.

While the following description relates to use of the present systems and methods for avionics software certification, it should be understood that that these systems and methods can be used in any applications where data and control coupling information is required.

INTRODUCTION

As part of avionics software certification processes and DO-178C guidelines, it is mandatory to produce a data coupling and control coupling report and analysis from requirements-based testing for every airborne software component (DAL C and above).

Existing instrument-based solutions have various limitations (as explained previously in the background section), overhead on the hardware resources usage (memory and processor throughput), and higher cost and cycle time. In addition, there are no commercial-off-the-shelf (COTS) tools in the industry that can provide instrument-less data coupling and control coupling data from requirements-based tests execution.

New avionics software development programs seeking certification are expected to meet the DO-178C guidelines, for both military and civil aircraft. The major change in DO-178C with respect to data coupling and control coupling (DC-CC) compared to the prior DO-178B guidelines, is that DO-178C section 6.4.4.2c states that analysis to confirm that the requirements-based testing has exercised the data and control coupling between code components is required. In section 6.4.4.2.c, this activity is further clarified such that the structural coverage analysis of data and control coupling between code components should be achieved by assessing the results of the requirements-based tests. In recent certification reviews of DO-178C based programs, it was shown that that evidence must be provided to justify that the requirements-based testing has exercised the data and control coupling, and mere conventional design and code review is not sufficient.

Figure 1A:
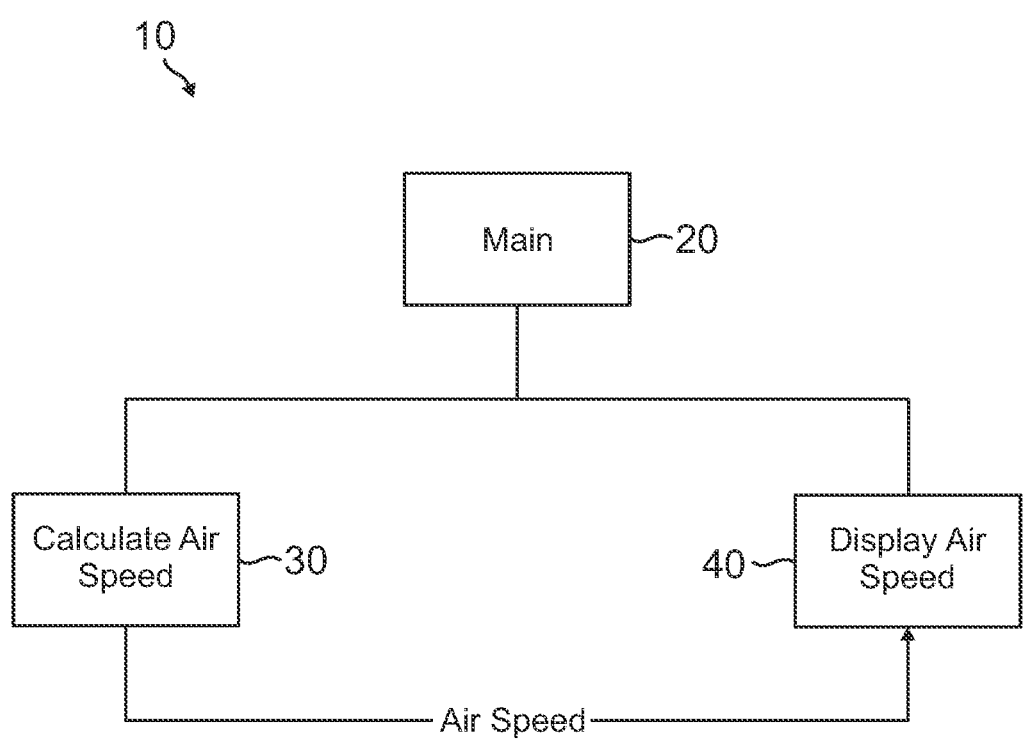
FIG. 1A is an example control flow and coupling diagram, created from the software architecture and design of a sample program under test.

The shift in emphasis from confirm the coupling (DO-178B) to confirm the exercising of the coupling (DO-178C) changes the DC-CC objective from an analytical exercise against the test design to a measurement exercise against the test execution. To satisfy the DO-178C section 6.4.4.2c objectives, the following evidence, for example as shown in FIG. 1A, must be provided from the execution of requirement-based testing. FIG. 1A depicts an example control flow and coupling diagram 10, created from the software architecture and design of a sample program under test. For control coupling, the call from a main subprogram 20 to a calculate air speed subprogram 30 should be first in the sequence; the call from the main subprogram 20 to a display air speed subprogram 40, should be second in the sequence; and there are no other subprograms called between this sequence. For data coupling, in the passing of air speed data from the calculate air speed subprogram 30 to the display air speed subprogram 40, there needs to be evidence to confirm that the air speed data read/used by the display air speed subprogram 40 is the same air speed data that was computed and set in the calculate air speed subprogram 30. There also needs to be evidence to confirm that the air speed is set in the calculate air speed subprogram 30 first before the air speed data is used in the display air speed subprogram 40. No other function other than the calculate air speed subprogram 30 should alter the value of the air speed data before it is read and used by the display air speed subprogram 40.

For the new objective/activity introduced in DO-178C, the data and control coupling analysis is being done either manually or using the various COTS solutions. While COTS tools vendors have been working with avionics software suppliers and certification agencies to understand the requirements and expected data to collect in order to demonstrate the DC-CC compliance, there are no proven instrument-less solutions available yet to measure and report the DC-CC information from requirements-based tests execution.

In using manual analysis, the test engineer has to understand the software architecture, requirements, and design the test to ensure that data coupling and control coupling objectives are met. Understanding the entire software architecture is a very tedious task, especially when the software architecture diagrams are not present. Even if the software architecture diagrams are present in the form of UML diagrams, the test engineer has to put in more manual effort to understand interactions between components/modules. The test engineer must manually derive the DC-CC information, and needs to compare it with the expected DC-CC data defined in the software architecture and design to validate the correctness.

In prior approaches, there is no end-to-end solution to parse the architecture diagram to obtain expected data and control coupling information, extract the actual data and control coupling information from the map and execution trace file, and compare the actual data and control coupling information with respect to the expected data and control coupling information, to decide a PASS/FAIL status of the software under test.

Overview of Verifying Data Coupling and Control Coupling

The present approach provides a non-intrusive (instrument-less) method to generate and verify data coupling and control coupling from requirements-based test execution. This approach generally includes: extracting expected data and control coupling data from the software architecture and design automatically; deriving the actual control coupling information from the execution trace data obtained from requirements-based test execution; deriving the actual data coupling information from the data trace information, i.e., memory read and write operations; and comparing the actual data and control coupling information with the expected data and control coupling information automatically.

The present method extracts actual data coupling and control coupling information, without instrumenting the source code while executing requirement-based tests. The present approach also provides a fully automated system, which provides an end-to-end solution of deriving the expected and actual control couplings, and comparing and providing the overall control coupling coverage status and gaps.

In one implementation, a processor emulator is modified and a software component/block called a "trace control module" is added in the emulator. The trace control module collects and transmit the following additional data required to know information about the data and control couplings exercised: a) information about target memory read or write operation type; b) memory target address of all read and write operations and its sequence number; c) a unique incremental sequence number created and maintained for each executed instruction; d) execution trace of the program, i.e., address of all the executed instructions. Items a, b and c above are extra data in addition to the execution trace of the program.

The present approach also provides a method of constructing the source code level data and control coupling information using the customized DC-CC trace data received from the target system (production operating environment) and disassembly file and map file. The address of all the read and write operations from the customized DC-CC execution trace data is extracted, then each of these addresses is checked in the map file to identify its corresponding global variable. Instruction type information from the customized DC-CC execution trace data is used to identify if the given operation is either read or write. The address of the read/write instruction from the customized DC-CC execution trace data is checked in the function address range information from the disassembly file to identify the actual function name where the given read or write operation has happened. A data coupling table is built using the information generated from the above steps for all the global variables, such as shown in Table 1.

TABLE 1

| Sequence No. | Global Variable Name | "Set/Write Operation" Function Name | "Read Operation" Function Name |
|---|---|---|---|
| 1 | Variable_1 | Function_1 | Function_2 |
| 2 | Variable_2 | Function_3 | Function_4 |

The expected control couplings are derived from analyzing the software architecture and design.

The present approach has zero overhead on hardware resources usage, such as memory and central processing unit (CPU) throughput, and reduces the overall cycle time required for data and control coupling analysis by about 75%.

Further details related to the present systems and methods are described as follows.

Figure 1B:
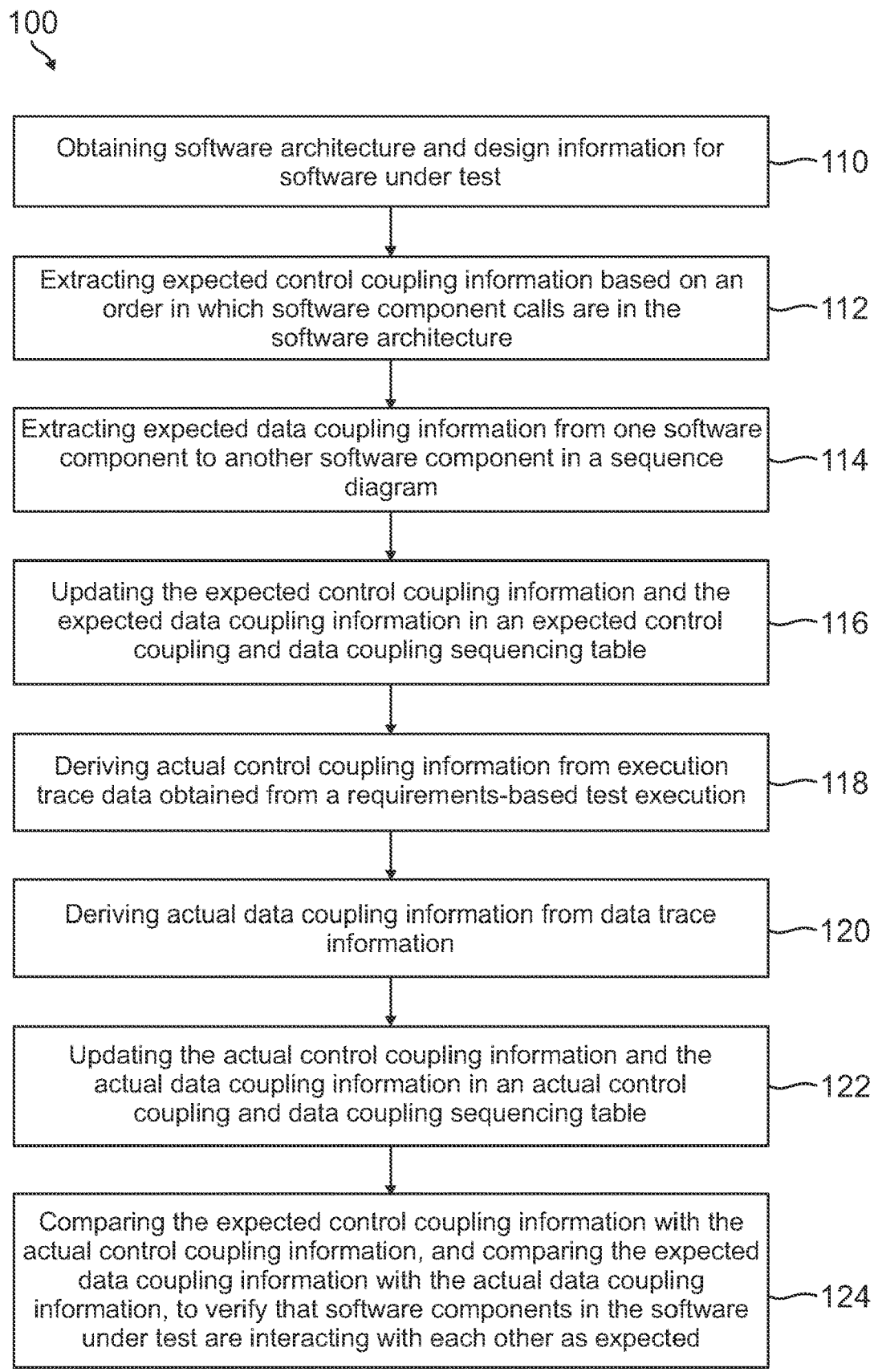
FIG. 1B is flow diagram of an exemplary method for measuring and verifying data and control coupling, according to one implementation.

FIG. 1B is flow diagram of an exemplary method 100 for measuring and verifying data and control coupling, according to one implementation. The method 100 comprises obtaining software architecture and design information for software under test (block 110), such as avionics software that needs to be certified. The method 100 further includes extracting expected control coupling information based on an order in which software component calls are in the software architecture (block 112), and extracting expected data coupling information from one software component to another software component in a sequence diagram (block 114). The method 100 then updates the expected control coupling information and the expected data coupling information in an expected control coupling and data coupling sequencing table (block 116). The method 100 also comprises deriving actual control coupling information from execution trace data obtained from a requirements-based test execution (bock 118), and deriving actual data coupling information from data trace information (block 120). The method 100 then updates the actual control coupling information and the actual data coupling information in an actual control coupling and data coupling sequencing table (block 122). Finally, method 100 compares the expected control coupling information with the actual control coupling information, and compares the expected data coupling information with the actual data coupling information, to verify that software components in the software under test are interacting with each other as expected (block 124).

Figure 2A:
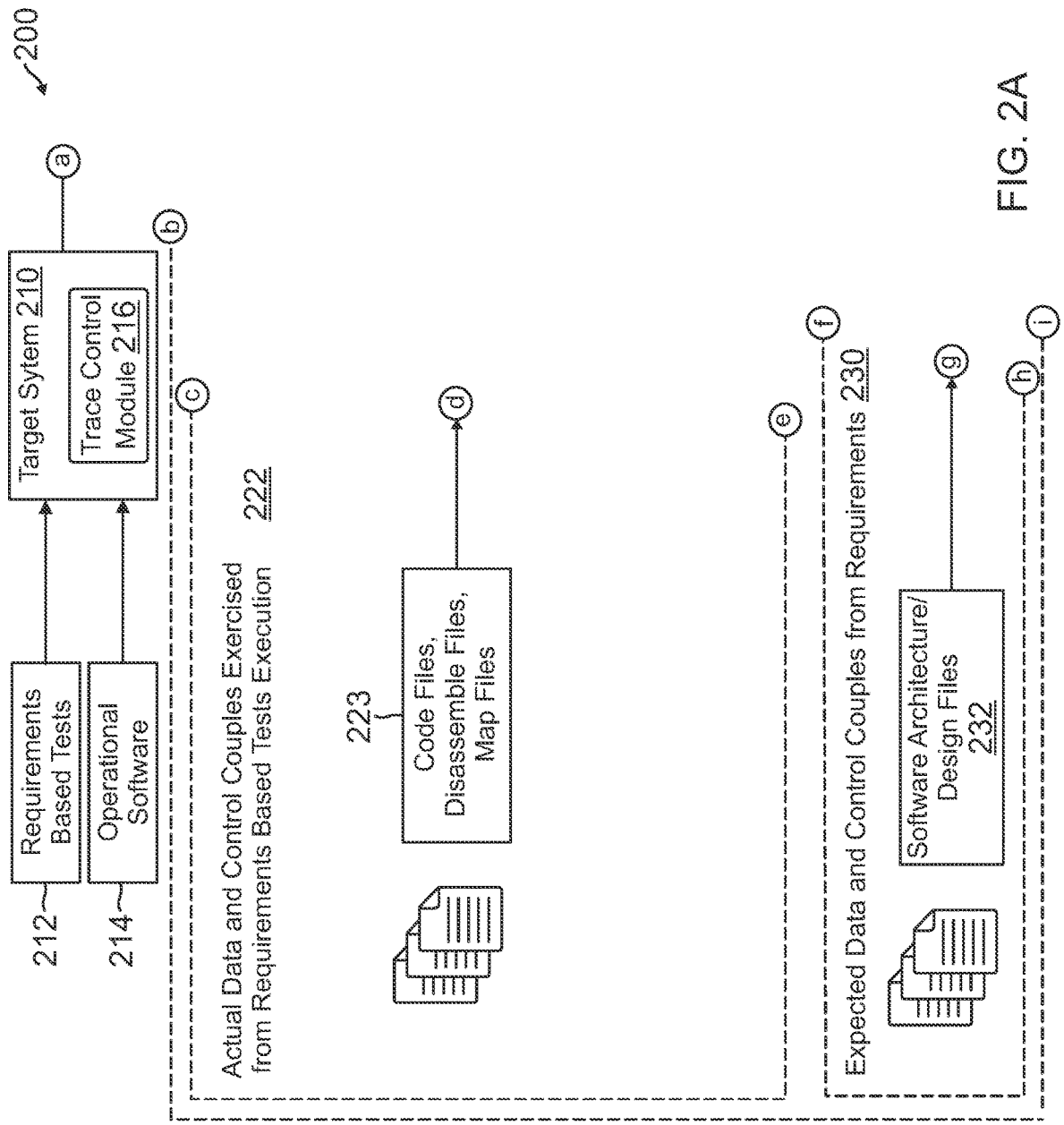
FIGS. 2A and 2B depict a functional block diagram of a software test system for measuring and verifying data and control coupling, according to one embodiment.
Figure 2B:
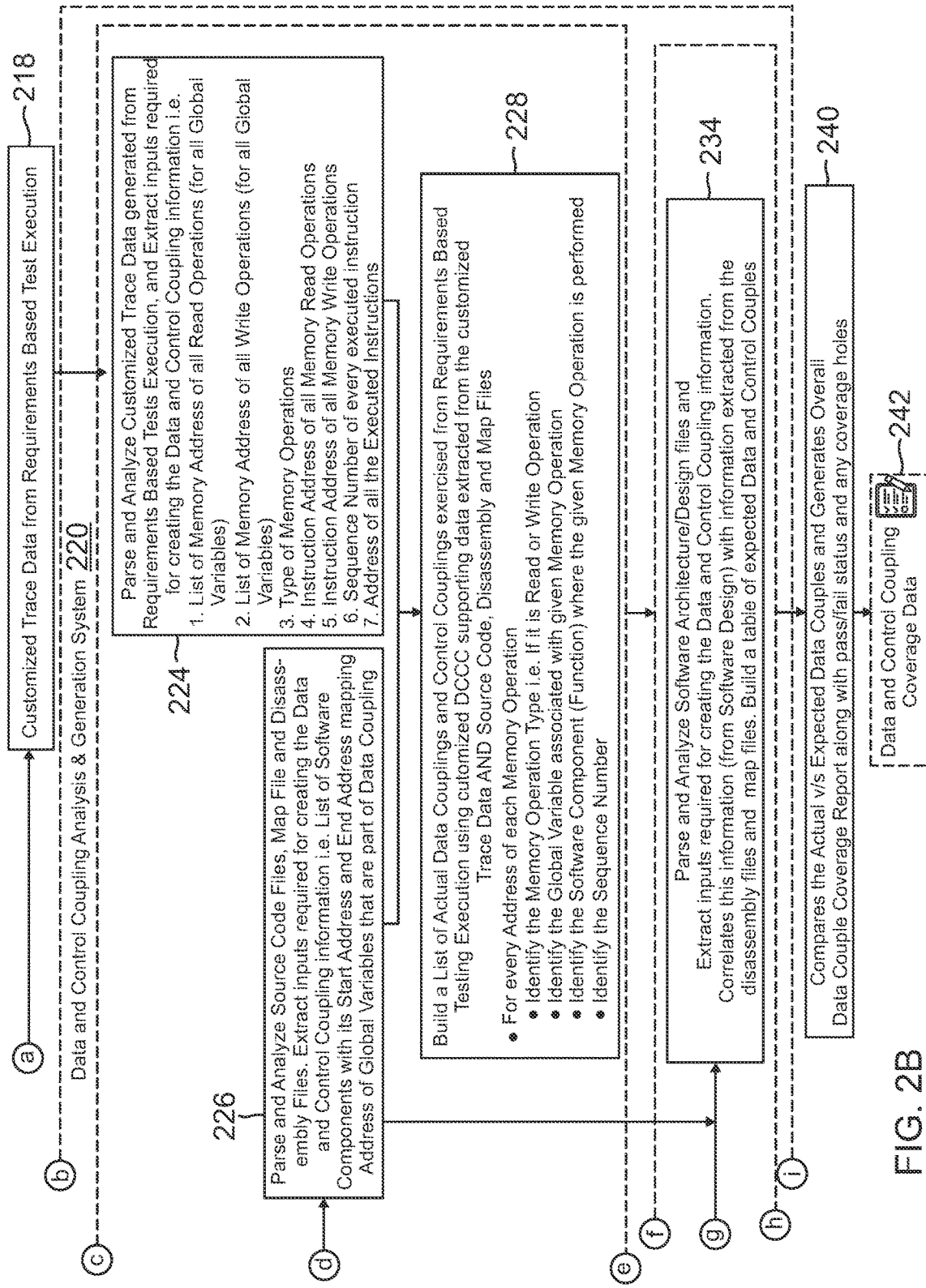

FIGS. 2A and 2B depict a software test system 200 for measuring and verifying data and control coupling, according to one embodiment. The test system 200 includes a target processing system 210, which can be either processor hardware or a processor emulator. The test system 200 is configured to receive requirement based tests 212 and as-is operational software 214. The target processing system 210 includes a trace control module 216, which is operative to create and transmit customized information required for data and control couplings. In particular, trace control module 216 is operative to create and transmit read/write target memory addresses, an address of each executed instruction, target memory operation type, and sequence number for each instruction, in real time continuously, to produce customized trace data from the requirement based tests execution (block 218).

A data and control coupling analysis and generation system 220 is operative to produce actual data and control couples exercised from the requirements based tests execution (block 222), based on the customized trace data (from block 218) and code files, disassemble files, and map files (block 223). In particular, data and control coupling analysis and generation system 220 parses and analyzes customized trace data generated from the requirements based tests execution; and extracts inputs required for creating the data and control coupling information, including a list of memory addresses of all read operations (for all global variables), a list of memory addresses of all write operations (for all global variables), type of memory operations, instruction address of all memory read operations, instruction address of all memory write operations, sequence number of every executed instruction, and address of all executed instructions (block 224). The data and control coupling analysis and generation system 220 also parses and analyzes source code files, map files, and disassembly files; and extracts inputs required for creating the data and control coupling information, including a list of software components with start address and end address mapping, and addresses of global variables that are part of the data coupling (block 226).

The data and control coupling analysis and generation system 220 then builds a list of actual data coupling and control couplings exercised from the requirements based tests execution using customized DC-CC supporting data extracted from the customized trace data and source code, disassembly files, and map files (block 228). This includes, for every address of each memory operation: identify the memory operation type, i.e., whether it is read or write operation; identify the global variable associated with a given memory operation; identify the software component where the given memory operation is performed; and identify the sequence number.

The data and control coupling analysis and generation system 220 is also operative to produce expected data and control couples from requirements (block 230), based on software architecture and design files (block 232), and the information from block 226. The data and control coupling analysis and generation system 220 then parses and analyzes architecture and design files, and extracts inputs required for creating the expected data and control coupling information (block 234). The information from the software design is correlated with information extracted from the disassembly files and map files, to build a table of expected data and control couples.

The test system 200 then compares the actual and expected data and control couples, and generates an overall data and control couples coverage report, along with pass/fail status and any coverage holes (block 240), and outputs the data and control couples coverage report (block 242), for further use in the software verification process.

Further details related to the techniques used to measure and verify the control coupling and data coupling are described as follows.

Measuring and Verifying Control Coupling

Figure 3:
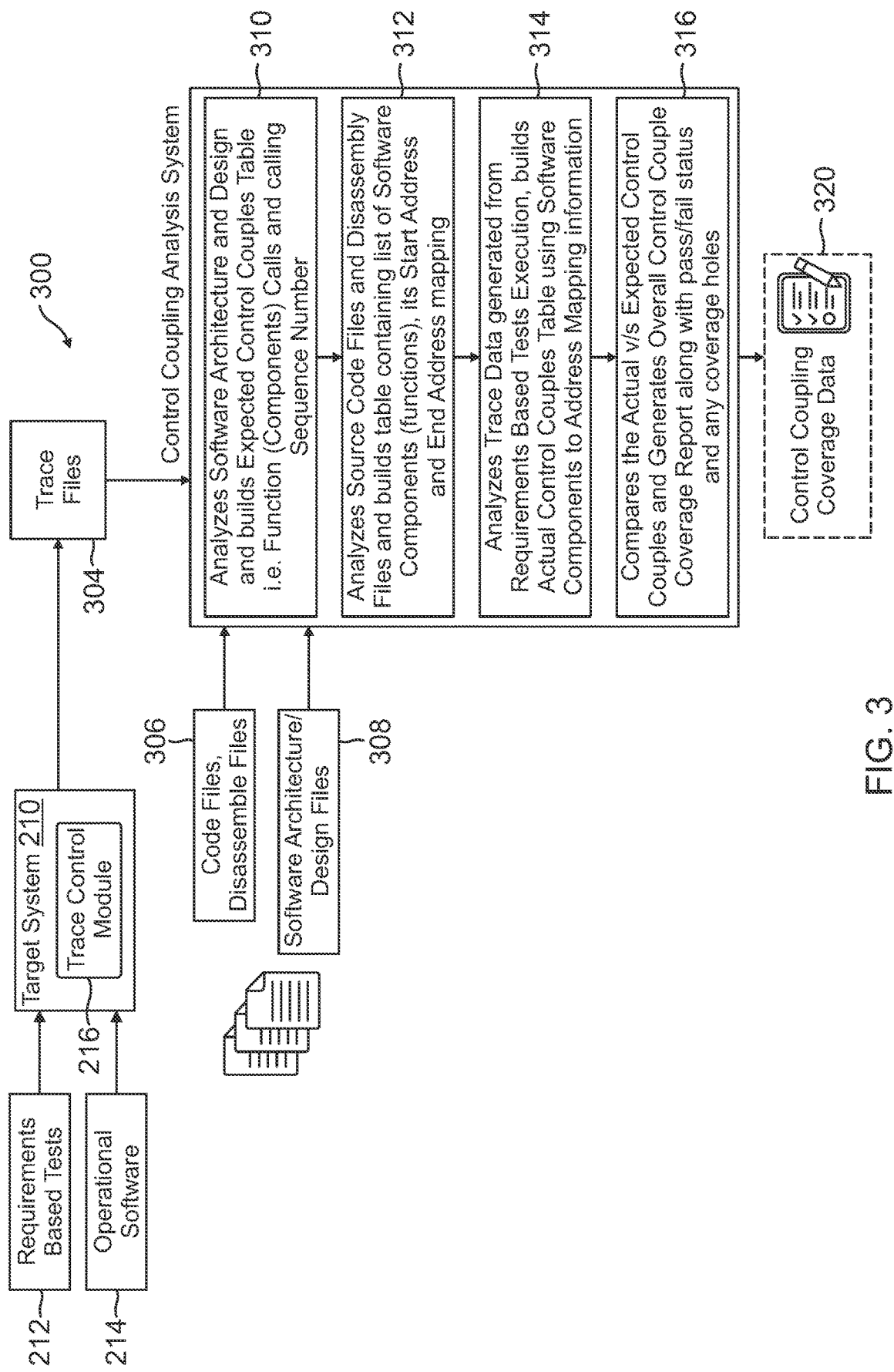
FIG. 3 is a functional block diagram of a control coupling analysis system for measuring and verifying control coupling, according to one implementation, which can be employed by the test system of FIGS. 2A and 2B.

FIG. 3 is a functional block diagram of a control coupling analysis system 300 for measuring and verifying control coupling, according to one implementation, which can be employed by test system 200. The control coupling analysis system 300 is in operative communication with target processing system 210, which is configured to receive requirements based tests 212 and operational software 214 as described above (FIG. 2). The target processing system 210 includes trace control module 216, which is operative to create and transmit the unique incremental sequence number for each executed instruction of a program, along with the address of each executed instruction (execution trace) of the program, in real time continuously, to produce customized trace files 304.

The control coupling analysis system 300 is configured to receive information from trace files 304, along with source code files and disassemble files 306, and software architecture and design files 308. The control coupling analysis system 300 is operative to: analyze the software architecture and design to build an expected control couples table, including software component calls and calling sequence numbers (block 310); analyze source code files and disassemble files to build a table containing a list of software components, with start address and end address mapping (block 312); analyze the trace data generated from the requirements based tests execution, and build an actual control couples table using the software components to address mapping information (block 314); compare the actual control couples with the expected control couples, and generate an overall control couple coverage report along with pass/fail status and any coverage holes (block 316). The control coupling analysis system 300 then outputs the control coupling coverage data (block 320), for further use in the overall software verification process.

Further details of the operation of control coupling analysis system 300 are described as follows.

At the start, the as-is operational software 214 is loaded into target processing system 210. The "as-is" meaning of operational software 214 refers to original software without instrumenting the code for DC-CC coverage tracking. The target processing system 210 is powered up, and the requirements based tests 212 are executed on target processing system 210. The trace control module 216 maintains a sequence counter, which is an incremental counter that is incremented every time an instruction is executed. The address of each executed instruction and a sequence number are collected in trace files 304 for transmission to control coupling analysis system 300, which is offline.

The control coupling analysis system 300 reads the disassembly file of the program under test and builds a functions list lookup table containing the function name and start address of each of the functions. The disassembly file for the program contains the start and end address of all the functions. The control coupling analysis system 300 also reads the software architecture for the control flow diagram and detail design for algorithmic steps, to analyze and identify the list of control couples from the requirement. This data forms the expected control couples to be used for the control coupling coverage analysis.

Figure 4A:
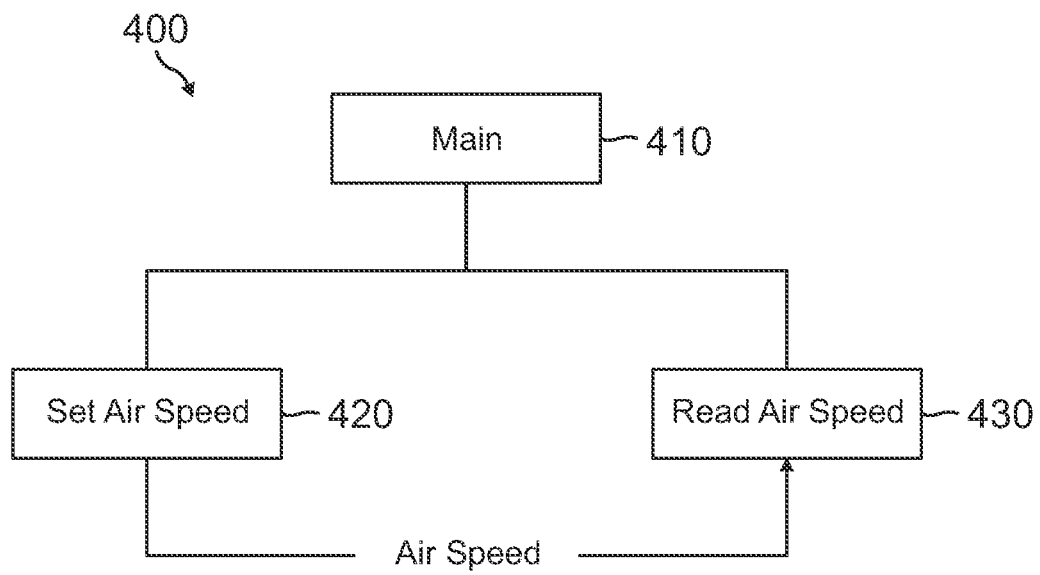
FIG. 4A is another example control flow and coupling diagram, created from the software architecture and design of a sample program under test.

FIG. 4A is an example of a control flow and coupling diagram 400, created from the software architecture and design of a sample program under test. As shown in the example of FIG. 4A, there are three components, including a main subprogram 410, which calls two subprograms, including a set air speed subprogram 420 and a read air speed subprogram 430. The set air speed is passed from subprogram 420 to subprogram 430 using an air speed global variable 440. In this example, there exists control coupling between main subprogram 410 and subprogram 420, and control coupling between main subprogram 410 and subprogram 430.

Figure 4B:
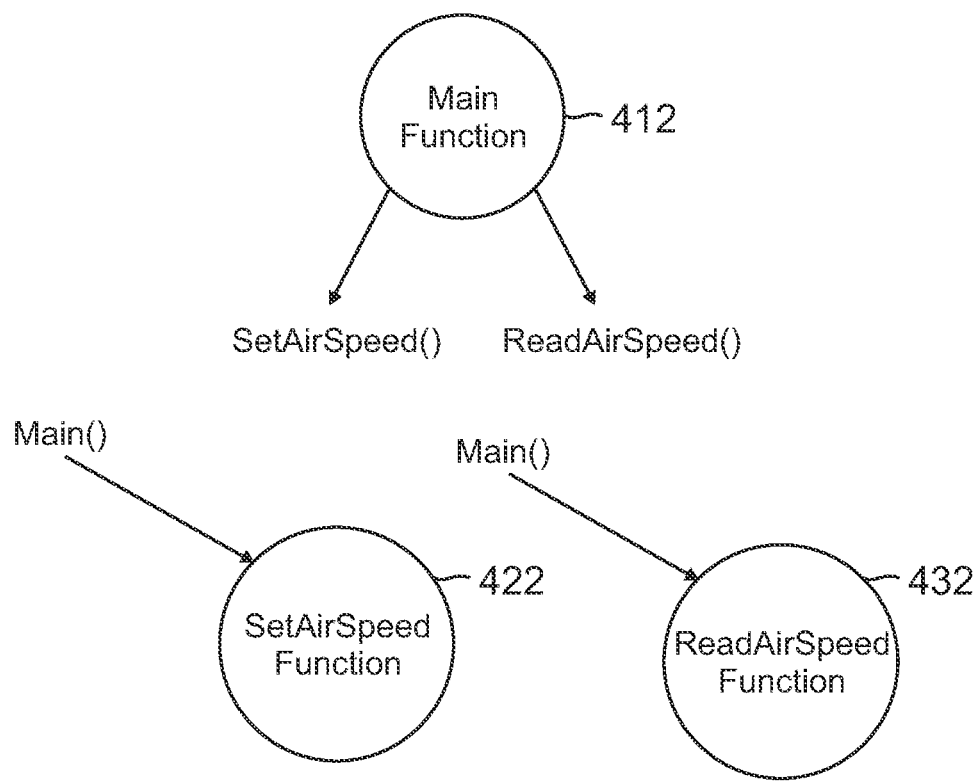
FIG. 4B is a schematic diagram of control couples based on the control flow and coupling diagram of FIG. 4A.

FIG. 4B illustrates the control couples based on control flow and coupling diagram 300. The following control couples are identified and a control coupling sequence table is built from requirements: control coupling between a "Main" function 412 and a "SetAirSpeed" function 422, which is the subprogram call from main subprogram 410 to set air speed subprogram 420; and the control coupling between "Main" function 412 and a "ReadAirSpeed" function 432, which is the subprogram call from main subprogram 410 to read air speed subprogram 430. The control coupling sequence table generated from the design requirement is given below in Table 2.

TABLE 2

| | |
|---|---|
| Sequence S: | main |
| Sequence S + 1: | SetAirSpeed |
| Sequence S + 2: | ReadAirSpeed |
| Sequence S + 3: | SetAirSpeed |
| Sequence S + 4: | ReadAirSpeed |
| Sequence S + 5: | SetAirSpeed |
| Sequence S + 6: | ReadAirSpeed |

Returning to FIG. 3, the control coupling analysis system 300 analyzes the trace data received from target processing system 210 via trace control module 216, and identifies the actual control couples exercised from requirements based test execution.

An example of received trace data containing the address of all instructions executed and their sequence numbers is given below in Table 3. Various control coupling details can be generated from the trace data.

TABLE 3

Trace Sequence 0: NIP = 0x 6020dbc opcode = 0x9421fff0 TRACE_EXECUTED_NOT_TAKEN
Trace Sequence 1: NIP = 0x 6020dc0 opcode = 0x7c0802a6 TRACE_EXECUTED_NOT_TAKEN
Trace Sequence 2: NIP = 0x 6020dc4 opcode = 0x93e1000c TRACE_EXECUTED_NOT_TAKEN
Trace Sequence 3: NIP = 0x 6020dc8 opcode = 0x90010014 TRACE_EXECUTED_NOT_TAKEN
Trace Sequence 4: NIP = 0x 6020dcc opcode = 0x48014a8d TRACE_BRANCH_TAKEN
Trace Sequence 5: NIP = 0x 6035858 opcode = 0x4e800021 TRACE_BRANCH_TAKEN
................
..................
Trace Sequence 123: NIP = 0x 6000600 opcode = 0x9421fff0 TRACE_EXECUTED_NOT_TAKEN
Sequence no: 123 --- Function _init invoked
Trace Sequence 124: NIP = 0x 6000604 opcode = 0x7c0802a6
TRACE_EXECUTED_NOT_TAKEN
...................
....................
Trace Sequence 166: NIP = 0x 60004fc opcode = 0x9421fff8 TRACE_EXECUTED_NOT_TAKEN
Sequence no: 166 --- Function main invoked
Trace Sequence 167: NIP = 0x 6000500 opcode = 0x7c0802a6
TRACE_EXECUTED_NOT_TAKEN
Trace Sequence 168: NIP = 0x 6000504 opcode = 0x9001000c
TRACE_EXECUTED_NOT_TAKEN
Trace Sequence 169: NIP = 0x 6000508 opcode = 0x38600064
TRACE_EXECUTED_NOT_TAKEN
Trace Sequence 170: NIP = 0x 600050c opcode = 0x4bffff65 TRACE_BRANCH_TAKEN
Trace Sequence 171: NIP = 0x 6000470 opcode = 0x9421fff0 TRACE_EXECUTED_NOT_TAKEN
Sequence no: 171 --- Function SetAirSpeed invoked
Trace Sequence Trace no: 172: NIP = 0x 6000474 opcode = 0x7c0802a6
TRACE_EXECUTED_NOT_TAKEN
Trace Sequence 173: NIP = 0x 6000478 opcode = 0x93c10008
TRACE_EXECUTED_NOT_TAKEN
Trace Sequence 174: NIP = 0x 600047c opcode = 0x93e1000c TRACE_EXECUTED_NOT_TAKEN
Trace Sequence 175: NIP = 0x 6000480 opcode = 0x90010014
TRACE_EXECUTED_NOT_TAKEN
Trace Sequence 176: NIP = 0x 6000484 opcode = 0x48000005 TRACE_BRANCH_TAKEN
............................
Trace Sequence 189: NIP = 0x 60004b8 opcode = 0x9421fff0 TRACE_EXECUTED_NOT_TAKEN
Sequence no: 189 --- Function ReadAirSpeed invoked
Trace Sequence 190: NIP = 0x 60004bc opcode = 0x7c0802a6 TRACE_EXECUTED_NOT_TAKEN
Trace Sequence 191: NIP = 0x 60004c0 opcode = 0x93c10008
TRACE_EXECUTED_NOT_TAKEN
Trace Sequence 192: NIP = 0x 60004c4 opcode = 0x93e1000c TRACE_EXECUTED_NOT_TAKEN
Trace Sequence 193: NIP = 0x 60004c8 opcode = 0x90010014
TRACE_EXECUTED_NOT_TAKEN
............................
Trace Sequence 336: NIP = 0x 6010774 opcode = 0x816b07e8
TRACE_EXECUTED_NOT_TAKEN
Trace Sequence 337: NIP = 0x 6010778 opcode = 0x7d6903a6
TRACE_EXECUTED_NOT_TAKEN
Trace Sequence 338: NIP = 0x 601077c opcode = 0x4e800420 TRACE_BRANCH_TAKEN The control coupling analysis system 300 then compares the expected control couplings derived from requirements with the actual control couplings extracted from trace data, and reports the correctness status. An example report giving the sequence numbers, control couplings, and control coupling status is given below in Table 4.

TABLE 4

| Sequence | Control Couplings | Control Coupling Status |
| --- | --- | --- |
| 1 | main | PASS |
| 2 | main -> SetAirSpeed | PASS |
| 3 | main -> ReadAirSpeed | PASS |
| 4 | main -> SetAirSpeed | PASS |
| 5 | main -> ReadAirSpeed | PASS |
| 6 | main -> SetAirSpeed | PASS |
| 7 | main -> ReadAirSpeed | PASS |

Measuring and Verifying Data Coupling

Figure 5:
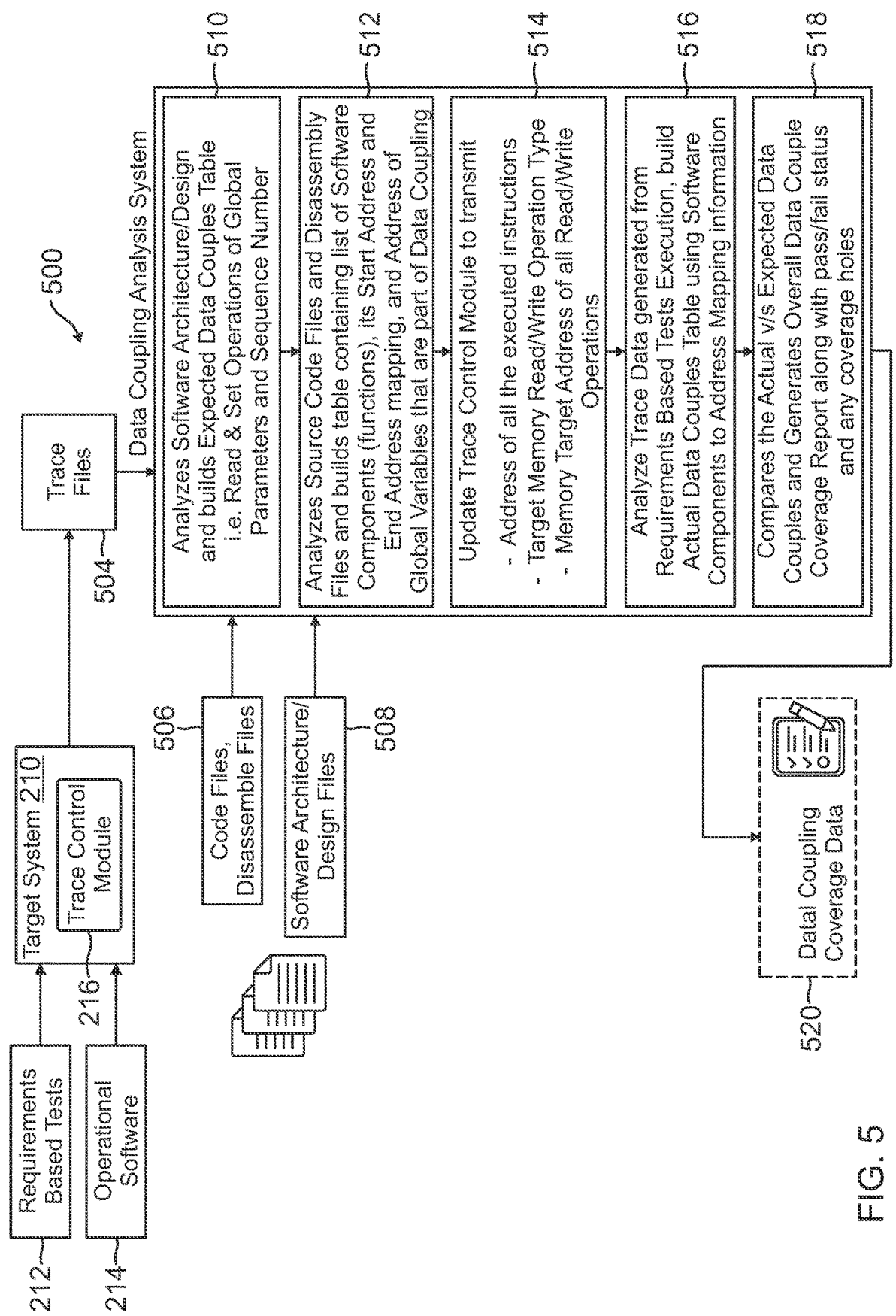
FIG. 5 is a functional block diagram of a data coupling analysis system for measuring and verifying data coupling, according to one implementation, which can be employed by the test system of FIGS. 2A and 2B.

FIG. 5 is a functional block diagram of a data coupling analysis system 500 for measuring and verifying data coupling, according to one implementation, which can be employed by test system 200. The data coupling analysis system 500 is in operative communication with target processing system 210, which is configured to receive requirements based tests 212 and operational software 214 as described above (FIG. 2). The target processing system 210 includes trace control module 216, which is operative to record and transmit the following data in real time: target memory read/write operation type and its sequence number; target memory address of all read/write operations; execution trace of the program, i.e., address of the executed instruction; and sequence number for each instruction. This data is used to produce customized trace files 504.

The data coupling analysis system 500, which is offline, is configured to receive information from trace files 504, along with source code files and disassemble files 506, and software architecture and design files 508. The data coupling analysis system 500 is operative to: analyze the software architecture and design to build an expected data couples table, including write and set operations of global variables (parameters), their function name, and sequence number (block 510); analyze source code files and disassembly files to build a table containing a list of software components, with start address and end address mapping, and addresses of global variables that are part of data coupling (block 512); update trace control module to transmit addresses of all executed instructions, target memory read/write operations type, and memory target addresses of all read/write operations (block 514); analyze trace data generated from the requirements based tests execution to build an actual data couples table using software components to address mapping information (block 516); and compare the actual verses expected data couples, and generate an overall data couple coverage report along with pass/fail status and any coverage holes (block 518). The data coupling analysis system 500 then outputs the data coupling coverage data (block 520), for further use in the overall software verification process.

Further details of the operation of data coupling analysis system 500 are described as follows.

At the start, the operational software 214 is loaded into target processing system 210. The target processing system 210 is powered up, and the requirements based tests 212 are executed on target processing system 210. The trace control module 216 collects and transmits the following data in real time required for determining the data coupling information: target memory read/write operation type; memory target address of all read/write operations and sequence number; and address of all the executed instructions.

The data coupling analysis system 500 reads the disassembly file of the program under test and builds a functions list lookup table containing the start address of each of the functions. The disassembly file for the program contains the start and end address of all the functions. The global variable addresses are found in the map file, and a lookup of the read/write instruction target memory address inside the trace file is performed. A determination is then made of the operations that are trying to read/write the addresses and corresponding functions, the detailed operation steps of the global variable (AirSpeed) are generated.

The data coupling analysis system 500 then compares the expected data couplings derived from requirements with the actual data couplings, and reports the correctness status. An example report giving the sequence numbers, data couplings, and data coupling status is given below in Table 5.

TABLE 5

| Sequence | Data Couplings for AirSpeed | Data Coupling Status |
|---|---|---|
| 1 | SetAirSpeed | PASS |
| 2 | ReadAirSpeed | PASS |
| 3 | SetAirSpeed | PASS |
| 4 | ReadAirSpeed | PASS |

Figure 6:
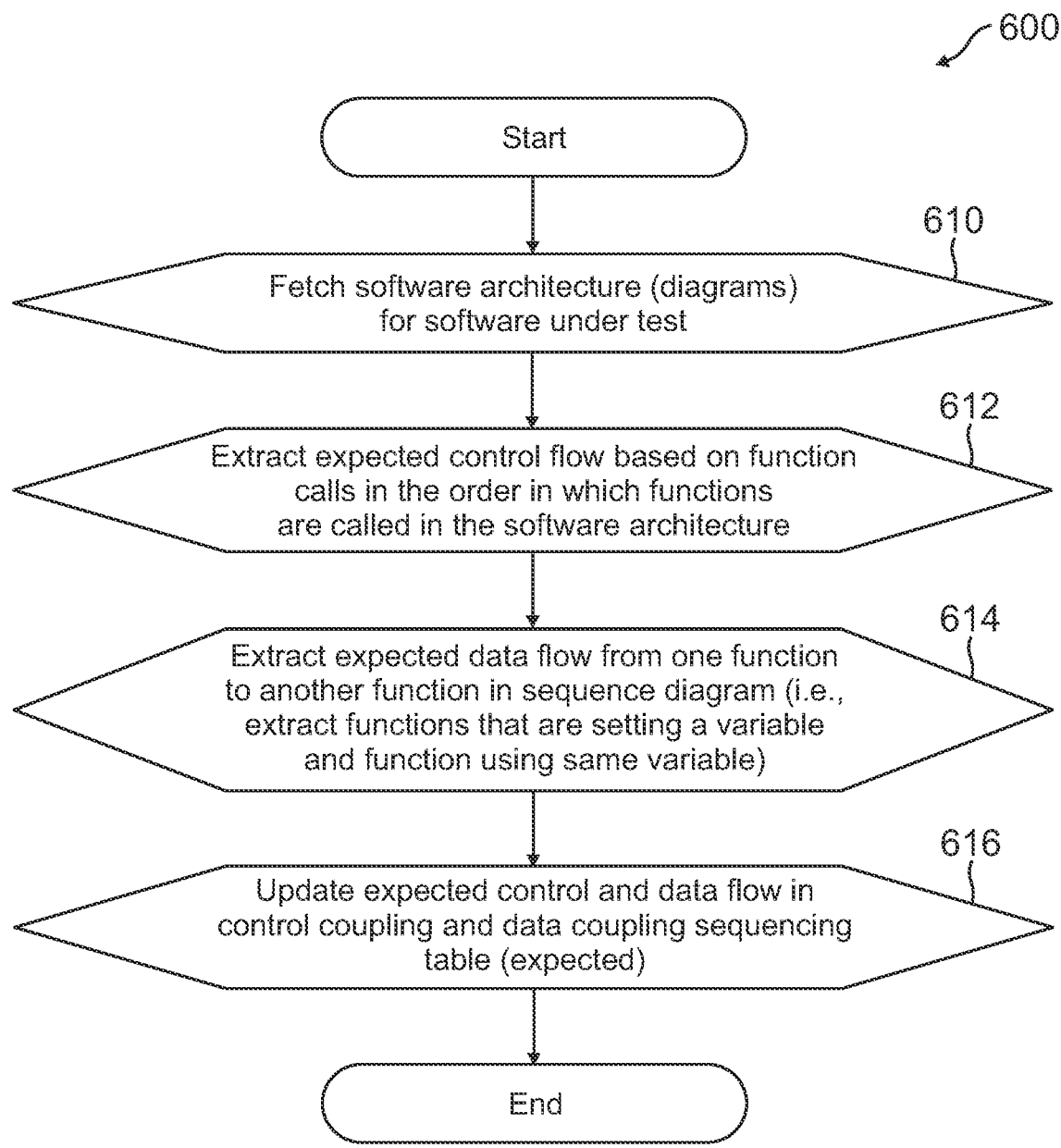
FIG. 6 is a flow diagram of a method for expected data and control coupling extraction from software architecture, according to an example implementation.

FIG. 6 is a flow diagram of a method 600 for expected CC-DC extraction from software architecture, according to an example implementation. At the start, method 600 fetches the software architecture (diagrams) for the software under test (block 610). The method 600 then extracts the expected control flow based on function calls in the order in which functions are called in the software architecture (block 612). The method 600 also extracts the expected data flow from one function to another function in a sequence diagram, i.e., extracts functions which are setting a variable and functions using the same variable (block 614). Finally, method 600 updates the expected control and data flow in a control coupling and data coupling sequencing table (expected) (block 616).

Figure 7:
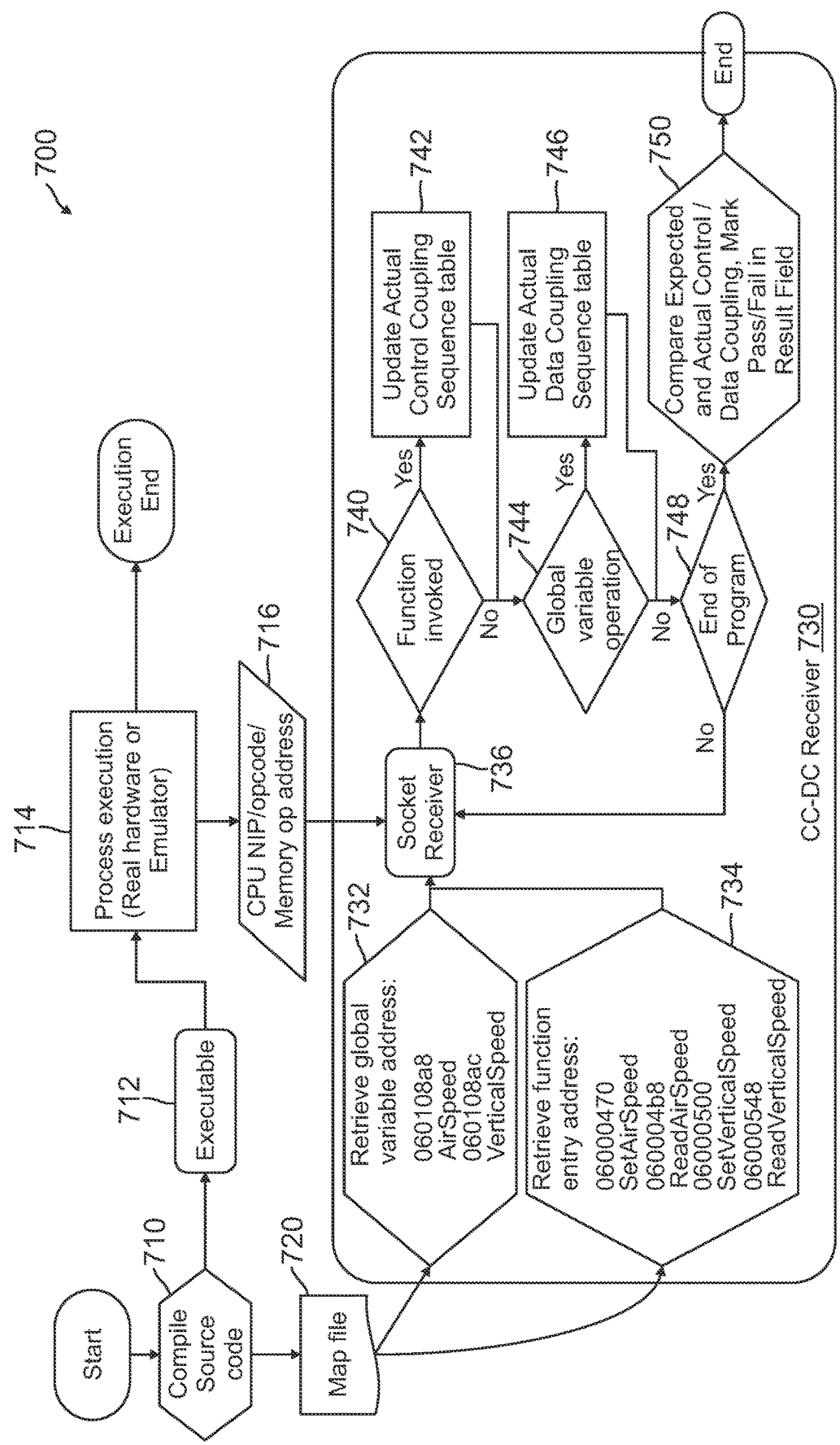
FIG. 7 is a flow diagram of a method for an execution portion to obtain actual data and control coupling information, according to an example implementation.

FIG. 7 is a flow diagram of a method 700 for an execution portion to obtain actual CC-DC data, according to an example implementation. At the start, method 700 compiles source code at 710, which is executable at 712 for process execution (in real hardware or emulator) (block 714). This produces CPU NIP/opcode/memory operation addresses at 716, and the execution ends. The compiled source code from 712 is also sent to a map file 720, which communicates with a CC-DC receiver 730. The CC-DC receiver 730 is configured to retrieve a global variable address (e.g., 060108a8 for AirSpeed, and 060108ac for VerticalSpeed) (block 732). The CC-DC receiver 730 is also configured to retrieve a function entry address (e.g., 06000470 for SetAirSpeed, 060004b8 for ReadAirSpeed, 06000500 for SetVerticalSpeed, and 06000548 for ReadVerticalSpeed) (block 734).

The global variable addresses (from block 732) and function entry addresses (from block 734) are sent to a socket receiver 736, which also receives the CPU NIP/opcode/memory operation addresses (from block 716). Output data from socket server 736 is used in a process to determine if a function is invoked (block 740). If yes, an actual control coupling sequence table is updated (block 742). If a function is not invoked (or after the actual control coupling update), a determination is made whether there is a global variable operation (block 744). If yes, an actual data coupling sequence table is updated (block 746). If there is not a global variable operation (or after the actual data coupling update), a determination is made whether the end of the program is reached (block 748). If not, the process returns to socket receiver 736 and the above steps are repeated starting at block 740. If the end of program is reached, the process compares the expected and actual control and data couplings, and marks pass/fail in a result field (block 750). The process then comes to an end.

An example of the execution portion to obtain actual CC-DC data is shown in FIG. 8. As depicted there, the control coupling requirement included: 1) SetAirSpeed(int) should be invoked then ReadAirSpeed( ) can be invoked; and 2) SetVerticalSpeed(int) should be invoked then ReadVerticalSpeed can be invoked. The data coupling requirement included: 1) Global variable AirSpeed should set by SetAirSpeed( ) first then ReadAirSpeed( ) can read the variable; and 2) Global variable VerticalSpeed should set by SetVerticalSpeed( ) first then ReadVerticalSpeed( ) can read the variable.

FIG. 9 shows a post analysis of the execution portion example of FIG. 8. As depicted in FIG. 9, for a CC trace example file, the SetAirSpeed( ) is invoked at sequence no. 171, and the ReadAirSpeed( ) is invoked at sequence no. 189; the SetVerticalSpeed( ) is invoked at sequence no. 208, and the ReadVerticalSpeed( ) is invoked at sequence no. 226. For a DC trace example file, the AirSpeed is set by SetAirSpeed( ) at sequence no. 181, and the AirSpeed is read by ReadAirSpeed( ) at sequence no. 199; the VerticalSpeed is set by SetVerticalSpeed( ) at sequence no. 218, and the VerticalSpeed is read by ReadVerticalSpeed( ) at sequence no. 236.

Example of Extraction of Expected Data and Control Coupling

As described previously, expected data and control coupling information is obtained from a software architecture sequence diagram. Typically, such a sequence diagram provides the control coupling between software modules in the order of sequence, and provides the data coupling between software components in the same sequence.

In an example case using Rational Rhapsody, the software architecture information is saved in an xml file format and is called (.sbs) file. A solution to obtain expected data and control coupling information is to parse the identity of data coupling (variables) and control coupling (function calls), the sequence in which this coupling happens, information about which component is calling which function, which component is setting data in the variable, and in which sequence the data is being used by a component from the software architecture files (.sbs) files.

In an example, for control coupling, the Component Object_0 is calling message_0 function from Object_1 as a sequence 1, then Object_1 component is calling message_1 as a sequence 2. In this example, for data coupling, as a sequence 3, Data1 is being used by Object_2 and Data 2 is set by Object_2 and used by Object_1 as a sequence 4. The solution parses expected information as mentioned above and generates expected data in a suitable format. This solution can parse entire information for a given project.

Tables 6 and 7 below show the expected data and control coupling between different software components, extracted from a software architecture diagram. The sequence column indicates the order of sequence in which two software components (sender and receiver) are coupled from the control coupling, and also provides the order in which data is set and used by the two software components.

The data and control flow information is captured in the following format for the sample program executed on the 777x ASC target. For the control coupling, the function calls message_0 and message_1 with entry and exit is captured along with a timestamp. This provides the sequence in which the functions are executed as follow:

+600; main; *fentry*

+9400; message_0; *fentry*

+10700; message_1; *fentry*

+12800; message_1; exit

+14700; message_0; exit

+16200; main; exit.

For the data coupling, the data flow (Data1 and Data2) information is present in the following format. The wr-word or rd-word command for each variable represents the set the data to the variable or reading the data from the variable. If

TABLE 6

| Sequence | Operation | Sender | Receiver | Type |
|---|---|---|---|---|
| 1 | initialize | ENV | Flow_Sensing_Control | PRIMITIVE |
| 3 | perform | ENV | Flow_Sensing_Control | PRIMITIVE |
| 10 | get_bool | Flow_Sensing_Control | A629_Communication | PRIMITIVE |
| 8 | is_validated | Flow_Sensing_Control | BIT | PRIMITIVE |
| | connector | Flow_Sensing_Control | Flow_Sensing_Control | CONDITION |
| 7 | is_detected | Flow_Sensing_Control | BIT | PRIMITIVE |
| | connector | Flow_Sensing_Control | Flow_Sensing_Control | CONDITION |
| 9 | get | Flow_Sensing_Control | Analog_IO | PRIMITIVE |
| 11 | get_bool | Flow_Sensing_Control | CAN_Sig_Data | PRIMITIVE |
| 6 | is_latched | Flow_Sensing_Control | BIT | PRIMITIVE |
| 12 | get_float | Flow_Sensing_Control | CAN_Sig_Data | PRIMITIVE |
| 4 | trace | Flow_Sensing_Control | Time_Tracker | PRIMITIVE |
| 5 | is_gm_enabled | Flow_Sensing_Control | Generic_Utilities | PRIMITIVE |
| 2 | is_cold_start | Flow_Sensing_Control | Executive | PRIMITIVE |

TABLE 7

| Sequence | Operation | Sender | Receiver | Type |
|---|---|---|---|---|
| 1 | message_0 | object_0 | object_1 | PRIMITIVE (Control Flow) |
| 4 | Data2 | object_2 | object_1 | DATAFLOW |
| | connector | object_2 | object_2 | CONDITION |
| 3 | Data1 | object_1 | object_2 | DATAFLOW |
| 2 | message_1 | object_1 | object_2 | EVENT (Control Flow) |
| | connector | object_2 | object_2 | CONDITION |
| 5 | Data3 | object_1 | object_0 | DATAFLOW |
| | connector | object_1 | object_1 | CONDITION |
| | connector | object_1 | object_1 | CONDITION |

Example of Extraction of Actual Data and Control Coupling

As described previously, high-level requirements are tested using either hardware and software integration (HSI) or software integration (SI) test methods. The data and control coupling analysis is obtained during the high-level requirements based testing. These methods use target hardware or an instruction set simulator based on the type of requirements.

The source code for an 777x ASC target is chosen and high-level requirements-based tests (HSI testing) corresponding to the software architecture and components are executed on the target. While executing the test, execution trace data is captured through a trace port and stored in the host machine along with data and control flow information.

the variable is read after writing the data, it indicates that data flow is working as expected. The present solution parses both the data and control coupling raw information and constructs actual data and control coupling in a table, listing the sequence in which functions are called and data flow happens.

The approach mentioned for target hardware can also be followed on a host machine for high level requirements-based software integration testing. The limited set of software component specific source code and the respective SI test cases are executed on a simulator. During the compilation, the MAP file is generated. The method parses the MAP file and fetches the address corresponding to each function and variables (data) as follows:

MAP File Sample:

| | Data: | |
|---|---|---|
| .sbss | 0x00022c48 | 0x6 Object_1.o |
| | 0x00022c48 | Data1 |
| | 0x00022c4a | Data3 |
| | 0x00022c4c | Data2 |
| | Function: | |
| .text | 0x000108c4 | 0x5c Object_1.o |
| | 0x000108c4 | message_0 |

| | | | |
|---|---|---|---|
| .text | 0x00010920 | | 0x54 Object_0.o |
| | 0x00010920 | | main |
| .text | 0x00010974 | | 0x3c Object_2.o |
| | 0x00010974 | | message_1 . |

Subsequently, the execution trace is obtained while executing the SI test on simulator hosted on a desktop machine. The following sample depicts the flow in which functions are executed and data is used and stored: Message_0 (with address) is called in the beginning and data (Data1) is stored using sth instruction and read using "lhz" after storing the data. The Data1 variable is identified by reading the address offset given prior to the key word "r9" and mapped with the address obtained from the MAP file with respect to base address.

The present method automates the entire process mentioned above and generate actual data and control coupling as mentioned for the target level data and control coupling. Example of Comparison of Actual with Expected Data and Control Coupling The present method compares the actual with expected data and control coupling, and declares PASS or FAIL based on the sequence of control and data flow, source of the data, user of the data, function provider and user. Table 8 below is a sample output of the comparison solution.

TABLE 8

| Sequence | Operation | Source | User | Type | Sequence Validation |
|---|---|---|---|---|---|
| 1 | message_0 | Object0 | Object1 | Control Flow | True |
| 2 | message_1 | Object1 | Object2 | Control Flow | True |
| 3 | Data1 | Object1 | | DATAFLOW | True |
| 3 | Data1 | | Object2 | DATAFLOW | True |
| 4 | Data2 | Object2 | | DATAFLOW | True |
| 4 | Data2 | | Object1 | DATAFLOW | True |
| 5 | Data3 | Object1 | | DATAFLOW | True |
| 5 | Data3 | | Object0 | DATAFLOW | True |
| | | | | | PASS |

The processing units and/or other computational devices used in the method and system described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: obtaining software architecture and design information for software under test; extracting expected control coupling information based on an order in which software component calls are in the software architecture; extracting expected data coupling information from one software component to another software component in a sequence diagram; updating the expected control coupling information and the expected data coupling information in an expected control coupling and data coupling sequencing table; deriving actual control coupling information from execution trace data obtained from a requirements based test execution; deriving actual data coupling information from data trace information; updating the actual control coupling information and the actual data coupling information in an actual control coupling and data coupling sequencing table; and comparing the expected control coupling information with the actual control coupling information, and comparing the expected data coupling information with the actual data coupling information, to verify whether software components in the software under test are interacting with each other as expected.

Example 2 includes the method of Example 1, wherein the execution trace data obtained from the requirements based test execution is provided by a target processing system that hosts requirements based tests and the software under test, the target processing system including a trace control module that generates the execution trace data.

Example 3 includes the method of Example 2, wherein the expected control coupling information is extracted, and the actual control coupling information is derived, using a control coupling analysis module that is in operative communication with the target processing system.

Example 4 includes the method of Example 3, wherein the control coupling analysis module performs a process comprising: analyzing software architecture and design files, for the software under test, to build a table of expected control couples, including software component calls and corresponding calling sequence numbers; analyzing source code and disassemble files, for the software under test, to build a table containing a list of software components with corresponding start address and end address mapping information; and analyzing the execution trace data from the requirements based tests execution, to build an actual control couples table, using the software components with corresponding address mapping information.

Example 5 includes the method of Example 4, wherein comparing the expected control coupling information with the actual control coupling information is performed by the control coupling analysis module, which generates an overall control couple coverage report, and outputs the control couple coverage report for use in verifying that the software components in the software under test are interacting with each other as expected.

Example 6 includes the method of any of Examples 2-5, wherein the expected data coupling information is extracted, and the actual data coupling information is derived, using a data coupling analysis module that is in operative communication with the target processing system.

Example 7 includes the method of Example 6, wherein the data coupling analysis module performs a process comprising: analyzing software architecture and design files, for the software under test, to build a table of expected data couples, including read and set operations of global variables, and sequence number; analyzing source code files and disassembly files to build a table containing a list of software components, with corresponding start address and end address mapping information, and addresses of global variables that are part of data coupling; updating the trace control module to transmit addresses of all executed instructions, a target memory read/write operations type, and memory target addresses of all read/write operations; and analyzing the execution trace data from the requirements based tests execution, to build an actual data couples table using the software components and corresponding address mapping information.

Example 8 includes the method of Example 7, wherein comparing the expected data coupling information with the actual data coupling information is performed by the data coupling analysis module, which generates an overall data couple coverage report, and outputs the data couple coverage report for use in verifying that the software components in the software under test are interacting with each other as expected.

Example 9 includes the method of any of Examples 1-8, wherein the software under test comprises avionics software.

Example 10 includes the method of Example 9, wherein the avionics software is subject to certification under DO-178C guidelines.

Example 11 includes a system for measuring and verifying data and control couplings of software under test, the system comprising: a target processing system configured to receive requirements based tests and the software under test, the target processing system including a trace control module operative to generate customized trace data from execution of the requirements based tests; and a data and control coupling analysis system in operative communication with the target processing system, wherein the data and control coupling analysis system is operative to produce actual data and control couples exercised from the execution of the requirements based tests, by a process that comprises: receive the customized trace data from execution of the requirements based tests from the target processing system; parse and analyze the customized trace data to extract a first set of inputs for creating actual data and control coupling information; parse and analyze source code files, map files, and disassembly files for the software under test, to extract a second set of inputs for creating the actual data and control coupling information; build a list of the actual data and control couples using customized supporting data extracted from the customized trace data, the source code files, the map files, and the disassembly files; wherein the data and control coupling analysis system is operative to produce expected data and control couples exercised from requirements, by a process that comprises: parse and analyze software architecture files and design files for the software under test, to extract inputs for creating expected data and control coupling information; correlating the expected data and control coupling information with information extracted from the disassembly files and map files; build a table of the expected data and control couples based on the correlated information; wherein the test system is configured to compare the actual data and control couples with the expected data and control couples, to generate an overall data and control couples coverage report, to verify whether software components in the software under test are interacting with each other as expected.

Example 12 includes the system of Example 11, wherein the first set of inputs for creating the actual data and control coupling information comprises: a list of memory addresses of all read operations for all global variables; a list of memory addresses of all write operations for all the global variables; identification of type for all memory operations; an instruction address for all memory read operations; an instruction address for all memory write operations; a sequence number of each executed instruction; and an address of each executed instruction.

Example 13 includes the system of any of Examples 11-12, wherein the second set of inputs for creating the actual data and control coupling information comprises: a list of software components with corresponding start address and end address mapping; and addresses of global variables that are part of data coupling.

Example 14 includes the system of any of Examples 11-13, wherein the list of actual data and control couplings comprises, for every address of each memory operation: identification of memory operation type as read operation or write operation; identification of the global variable associated with a given memory operation; identification of the software component where the given memory operation is performed; and identification of the sequence number of the given memory operation.

Example 15 includes the system of any of Examples 11-14, wherein the target processing system includes processor hardware or a processor emulator.

Example 16 includes the system of any of Examples 11-15, wherein the trace control module is operative to create and transmit read/write target memory addresses, an address of each executed instruction, target memory operation type, and sequence number for each instruction, in real time continuously, to produce the customized trace data from the execution of the requirements based tests.

Example 17 includes the system of any of Examples 11-16, wherein the overall data and control couples coverage report includes a pass/fail status for each software component, and any coverage holes.

Example 18 includes the system of any of Examples 11-17, wherein the software under test comprises avionics software.

Example 19 includes the system of Example 18, wherein the avionics software is subject to certification under DO-178C guidelines.

Example 20 includes a program product comprising: a processor readable medium having instructions stored thereon, executable by at least one processor, to perform a method for measuring and verifying data and control couplings of software under test, the method comprising: obtaining software architecture and design information for the software under test; extracting expected control coupling information based on an order in which software component calls are in the software architecture; extracting expected data coupling information from one software component to another software component in a sequence diagram; updating the expected control coupling information and the expected data coupling information in an expected control coupling and data coupling sequencing table; deriving actual control coupling information from execution trace data obtained from a requirements based test execution; deriving actual data coupling information from data trace information; updating the actual control coupling information and the actual data coupling information in an actual control coupling and data coupling sequencing table; and comparing the expected control coupling information with the actual control coupling information, and comparing the expected data coupling information with the actual data coupling information, to verify whether software components in the software under test are interacting with each other as expected.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
    automatically obtaining software architecture information and design information for a software under test;
    automatically extracting expected control coupling information based on an order in which software component calls are in a software architecture;
    automatically extracting expected data coupling information from one software component to another software component in a sequence diagram;
    automatically updating the expected control coupling information and the expected data coupling information in an expected control coupling and data coupling sequencing table;
    automatically deriving actual control coupling information in real time from execution trace data obtained from a requirements based test execution, wherein the execution trace data obtained from the requirements based test execution is provided by a target processing system that executes requirements based tests and the software under test, and wherein the target processing system includes a trace control module that generates the execution trace data in real time from the execution of the requirements based test;
    automatically deriving actual data coupling information in real time from data trace information;
    automatically updating the actual control coupling information and the actual data coupling information in an actual control coupling and data coupling sequencing table; and
    automatically comparing the expected control coupling information with the actual control coupling information, and automatically comparing the expected data coupling information with the actual data coupling information, to verify whether software components in the software under test are interacting with each other as expected.

2. The method of claim 1, wherein the expected control coupling information is extracted, and the actual control coupling information is derived, using a control coupling analysis module that is in operative communication with the target processing system.

3. The method of claim 2, wherein the control coupling analysis module performs a process comprising:
    analyzing software architecture files and design files, for the software under test, to build a table of expected control couples, including software component calls and corresponding calling sequence numbers;
    analyzing source code and disassemble files, for the software under test, to build a table containing a list of software components with corresponding start address and end address mapping information; and
    analyzing the execution trace data from the requirements based test execution, to build an actual control couples table, using the software components in the software under test with corresponding address mapping information.

4. The method of claim 3, wherein comparing the expected control coupling information with the actual control coupling information is performed by the control coupling analysis module, which generates an overall control couple coverage report, and outputs the overall control couple coverage report for use in verifying that the software components in the software under test are interacting with each other as expected.

5. The method of claim 1, wherein the expected data coupling information is extracted, and the actual data coupling information is derived, using a data coupling analysis module that is in operative communication with the target processing system.

6. The method of claim 5, wherein the data coupling analysis module performs a process comprising:
    analyzing software architecture files and design files, for the software under test, to build a table of expected data couples, including read and set operations of global variables, and sequence number;
    analyzing source code files and disassembly files to build a table containing a list of software components, with corresponding start address and end address mapping information, and addresses of global variables that are part of data coupling;
    updating the trace control module to transmit addresses of all executed instructions, a target memory read/write operations type, and memory target addresses of all read/write operations; and
    analyzing the execution trace data from the requirements based test execution, to build an actual data couples table using the software components in the software under test and corresponding address mapping information.

7. The method of claim 6, wherein comparing the expected data coupling information with the actual data coupling information is performed by the data coupling analysis module, which generates an overall data couple coverage report, and outputs the overall data couple coverage report for use in verifying that the software components in the software under test are interacting with each other as expected.

8. The method of claim 1, wherein the software under test comprises avionics software.

9. The method of claim 8, wherein the avionics software is subject to certification under DO-178C guidelines.

10. A system for measuring and verifying data and control couplings of a software under test, the system comprising:

a target processing system configured to automatically receive and execute requirements based tests and the software under test, wherein the target processing system includes a trace control module operative to generate customized execution trace data in real time from the execution of the requirements based tests, and wherein the target processing system includes a processor hardware; and a data and control coupling analysis system in operative communication with the target processing system, wherein the data and control coupling analysis system is operative to automatically produce actual data and control couples exercised from the execution of the requirements based tests, by a process that comprises:

receiving the customized execution trace data from execution of the requirements based tests from the target processing system;

parsing and analyzing the customized execution trace data in real time to extract a first set of inputs for creating actual data and control coupling information;

parsing and analyzing source code files, map files, and disassembly files for the software under test in real time, to extract a second set of inputs for creating the actual data and control coupling information; and building a list of the actual data and control couples using customized supporting data extracted from the customized execution trace data, the source code files, the map files, and the disassembly files;

wherein the data and control coupling analysis system is further operative to automatically produce expected data and control couples exercised from requirements, by a process that comprises:

parsing and analyzing software architecture files and design files for the software under test, to extract inputs for creating expected data and control coupling information;

correlating the expected data and control coupling information with information extracted from the disassembly files and the map files; and building a table of the expected data and control couples based on the correlated expected data and control coupling information with the information extracted from the disassembly files and the map files; and wherein the target processing system is further configured to automatically compare the actual data and control couples with the expected data and control couples, to generate an overall data and control couples coverage report, to verify whether software components in the software under test are interacting with each other as expected.

11. The system of claim 10, wherein the first set of inputs for creating the actual data and control coupling information comprises:
a list of memory addresses of all read operations for all global variables;
a list of memory addresses of all write operations for all the global variables;
identification of type for all memory operations;
an instruction address for all memory read operations;
an instruction address for all memory write operations;
a sequence number of each executed instruction; and
an address of each executed instruction.

12. The system of claim 10, wherein the second set of inputs for creating the actual data and control coupling information comprises:

a list of software components with corresponding start address and end address mapping; and
addresses of global variables that are part of data coupling.

13. The system of claim 10, wherein the list of the actual data and control couples comprises, for every address of each memory operation:
identification of a memory operation type as read operation or write operation;
identification of a global variable associated with a given memory operation;
identification of a software component where the given memory operation is performed; and
identification of a sequence number of the given memory operation.

14. The system of claim 10, wherein the trace control module is operative to create and transmit read/write target memory addresses, an address of each executed instruction, a target memory operation type, and a sequence number for each instruction, in real time continuously, to produce the customized execution trace data from the execution of the requirements based tests.

15. The system of claim 10, wherein the overall data and control couples coverage report includes a pass/fail status for each software component, and any coverage holes.

16. The system of claim 10, wherein the software under test comprises avionics software.

17. The system of claim 16, wherein the avionics software is subject to certification under DO-178C guidelines.

18. A program product comprising:
a non-transitory processor readable medium having instructions stored thereon, executable by at least one processor, to perform a method for measuring and verifying data and control couplings of a software under test, the method comprising:
automatically obtaining software architecture information and design information for the software under test;
automatically extracting expected control coupling information based on an order in which software component calls are in a software architecture;
automatically extracting expected data coupling information from one software component to another software component in a sequence diagram;
automatically updating the expected control coupling information and the expected data coupling information in an expected control coupling and data coupling sequencing table;
automatically deriving actual control coupling information in real time from execution trace data obtained from a requirements based test execution, wherein the execution trace data obtained from the requirements based test execution is provided by a target processing system that executes requirements based tests and the software under test, and wherein the target processing system includes a trace control module that generates the execution trace data in real time from the execution of the requirements based test;
automatically deriving actual data coupling information in real time from data trace information;
automatically updating the actual control coupling information and the actual data coupling information in an actual control coupling and data coupling sequencing table; and
automatically comparing the expected control coupling information with the actual control coupling information, and automatically comparing the expected data coupling information with the actual data coupling information, to verify whether software components in the software under test are interacting with each other as expected;

wherein the software under test comprises avionics software that is subject to certification under DO-178C guidelines.

\* \* \* \* \*